US011312841B2

United States Patent
Ono et al.

(10) Patent No.: US 11,312,841 B2
(45) Date of Patent: Apr. 26, 2022

(54) PNEUMATIC TIRE, AND RUBBER COMPOSITION FOR TIRE

(71) Applicant: Sumitomo Rubber Industries, Ltd., Hyogo (JP)

(72) Inventors: Shuichiro Ono, Kobe (JP); Subaru Toya, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 244 days.

(21) Appl. No.: 16/340,000

(22) PCT Filed: Jun. 26, 2018

(86) PCT No.: PCT/JP2018/024213
§ 371 (c)(1),
(2) Date: Apr. 5, 2019

(87) PCT Pub. No.: WO2019/012985
PCT Pub. Date: Jan. 17, 2019

(65) Prior Publication Data
US 2019/0359796 A1    Nov. 28, 2019

(30) Foreign Application Priority Data

Jul. 13, 2017 (JP) .............................. JP2017-137171

(51) Int. Cl.
*C08L 7/00* (2006.01)
*B60C 1/00* (2006.01)
*B60C 11/00* (2006.01)
*B60C 11/12* (2006.01)
*C08L 9/00* (2006.01)

(52) U.S. Cl.
CPC .............. *C08L 7/00* (2013.01); *B60C 1/0016* (2013.01); *B60C 11/0008* (2013.01); *B60C 11/12* (2013.01); *C08L 9/00* (2013.01); *B60C 2011/0025* (2013.01); *B60C 2011/129* (2013.01); *C08L 2201/08* (2013.01); *C08L 2205/025* (2013.01); *C08L 2205/03* (2013.01)

(58) Field of Classification Search
CPC .......... C08L 7/00; C08L 9/00; C08L 2201/08; C08L 2205/025; C08L 2205/03; B60C 1/0016; B60C 11/0008; B60C 11/12; B60C 2011/0025; B60C 2011/129
USPC .................................................. 152/209.18
See application file for complete search history.

(56) References Cited

U.S. PATENT DOCUMENTS

| | | | |
|---|---|---|---|
| 6,274,676 B1 | 8/2001 | Lin et al. | |
| 2004/0143066 A1 | 7/2004 | Galimberti et al. | |
| 2011/0144236 A1* | 6/2011 | Mihara | C08L 15/00 523/158 |
| 2013/0299053 A1 | 11/2013 | Fugier et al. | |
| 2015/0336430 A1* | 11/2015 | Sueyoshi | B60C 11/0316 152/209.24 |
| 2016/0304708 A1 | 10/2016 | Kushida | |
| 2018/0111422 A1 | 4/2018 | Tomida et al. | |
| 2019/0085156 A1 | 3/2019 | Sakurai | |

FOREIGN PATENT DOCUMENTS

| | | | | |
|---|---|---|---|---|
| CN | 105462007 A | 4/2016 | | |
| CN | 106457915 A | 2/2017 | | |
| EP | 0738614 A1 | 10/1996 | | |
| EP | 1630001 A1 | 3/2006 | | |
| JP | 2002-293111 A | 10/2002 | | |
| JP | 2007-022277 A | 2/2007 | | |
| JP | 2009-269981 A | 11/2009 | | |
| JP | 2010-195357 A | 9/2010 | | |
| JP | 2011-079940 A | 4/2011 | | |
| JP | 2013-170265 A | 9/2013 | | |
| JP | 2016-065160 A | 4/2016 | | |
| JP | 2016-074357 A | 5/2016 | | |
| WO | WO-2013032468 A2 * | 3/2013 | ........... | B60C 1/0016 |
| WO | 2015/083818 A1 | 6/2015 | | |
| WO | 2016084370 A1 | 6/2016 | | |
| WO | 2016/157906 A1 | 10/2016 | | |
| WO | 2016170522 A1 | 10/2016 | | |

OTHER PUBLICATIONS

International Search Report issued in PCT/JP2018/024213; dated Oct. 2, 2018.
Written Opinion issued in PCT/JP2018/024213; dated Oct. 2, 2018.

* cited by examiner

*Primary Examiner* — Angela C Scott
(74) *Attorney, Agent, or Firm* — Studebaker & Brackett PC

(57) ABSTRACT

The present invention provides a pneumatic tire and a rubber composition for tires, which have improved durability at high temperatures and during high-speed running while ensuring good ice performance. The present invention relates to a pneumatic tire, including a tread, the tread including blocks having an average ripe density of 1.0 $cm/cm^2$ or higher and an average height of 0.6 to 2.0 cm, the blocks containing a rubber composition having a tan δ at 100° C. of 0.179 or less as determined at an initial strain of 10%, a dynamic strain of 2%, and a frequency of 10 Hz, and has a ratio of the modulus at 100° C. to the modulus at room temperature of 69% or greater as determined in accordance with JIS K6251:2010.

10 Claims, 1 Drawing Sheet

PNEUMATIC TIRE, AND RUBBER COMPOSITION FOR TIRE

TECHNICAL FIELD

The present invention relates to a pneumatic tire and a rubber composition for tires.

BACKGROUND ART

Researchers have conducted various studies to improve the snow and ice performance of studless winter tires. Patent Literature 1, for example, discloses a technique involving the use of a foamed rubber in a tread.

CITATION LIST

Patent Literature

Patent Literature 1: JP 2010-195357 A

SUMMARY OF INVENTION

Technical Problem

Since conventional studless winter tires have low hardness at both low and high temperatures, and also include a large number of sipes in the tread blocks, cracks may occur around the sipes in high temperature environments such as summer where studless winter tires are usually not used or during high-speed running. Therefore, a new need has arisen for studless winter tires having durability at high temperatures and during high-speed running.

The present invention aims to solve the problem and provide a pneumatic tire and a rubber composition for tires, which have improved durability at high temperatures and during high-speed running while ensuring good ice performance.

Solution to Problem

The present invention relates to a pneumatic tire, including a tread, the tread including blocks having an average sipe density of 1.0 cm/cm$^2$ or higher and an average height of 0.6 to 2.0 cm, the blocks containing a rubber composition having: a tan δ at 100° C. of 0.179 or less as determined at an initial strain of 10%, a dynamic strain of 2%, and a frequency of 10 Hz; and a ratio of a modulus at 100° C. to a modulus at room temperature of 69% or greater as determined in accordance with JIS K6251:2010.

In the pneumatic tire, the tan δ at 100° C. is preferably 0.150 or less, more preferably 0.140 or less, still more preferably 0.120 or less.

The present invention also relates to a rubber composition for tires, having: a tan δ at 100° C. of 0.179 or less as determined at an initial strain of 10%, a dynamic strain of 2%, and a frequency of 10 Hz; and a ratio of a modulus at 100° C. to a modulus at room temperature of 69% or greater as determined in accordance with JIS K6251:2010.

In the rubber composition for tires, the tan δ at 100° C. is preferably 0.150 or less, more preferably 0.140 or less, still more preferably 0.120 or less.

The present invention also relates to a pneumatic tire, including a tread, the tread containing the rubber composition.

The pneumatic tire is preferably a winter tire or an all-season tire.

Advantageous Effects of Invention

The pneumatic tire of the present invention includes a tread including blocks which have an average sipe density of 1.0 cm/cm$^2$ or higher and an average height of 0.6 to 2.0 cm, and further which contain a rubber composition having a tan δ at 100° C. of 0.179 or less as determined at an initial strain of 10%, a dynamic strain of 2%, and a frequency of 10 Hz, and a ratio of the modulus at 100° C. to the modulus at room temperature of 69% or greater as determined in accordance with JIS K6251:2010. Such a pneumatic tire provides improved durability at high temperatures and during high-speed running while ensuring good ice performance.

DESCRIPTION OF EMBODIMENTS

The pneumatic tire of the present invention includes a tread including blocks. The blocks have an average sipe density of 1.0 cm/cm$^2$ or higher and an average height of 0.6 to 2.0 cm. Further, the blocks contain a rubber composition having a tan δ at 100° C. of 0.179 or less as determined at an initial strain of 10%, a dynamic strain of 2%, and a frequency of 10 Hz, and a ratio of the modulus at 100° C. to the modulus at room temperature of 69% or greater as determined in accordance with JIS K6251:2010.

A possible explanation is as follows. When tread blocks having an average sipe density and average height adjusted within the ranges indicated above are further adapted to have a tan δ at 100° C. reduced to the range indicated above, the equilibrium temperature of the tread surface during high-speed running in summer when ambient temperature may rise to about 35° C. can be controlled to around 100° C. Furthermore, by reducing the temperature-dependent changes in modulus to adjust the ratio of the modulus at 100° C. to the modulus at room temperature to the range indicated above, durability at high temperatures and during high-speed running can be improved.

Moreover, the modulus usually tends to decrease as the temperature increases, but in the present invention, the decrease in modulus at high temperatures is reduced probably because the tan δ at 100° C. is reduced to adjust the equilibrium temperature of the tread surface to around 100° C. as described above.

The rubber composition having a tan δ at 100° C. and ratio of the modulus at 100° C. to the modulus at room temperature which fall within the ranges indicated above is excellent in ice performance and durability and thus particularly suitable for winter tires and all-season tires.

In the pneumatic tire, the blocks should have an average sipe density of 1.0 cm/cm$^2$ or higher. To achieve the effects of the present invention well, the average sipe density is preferably 1.3 cm/cm$^2$ or higher, more preferably 1.5 cm/cm$^2$ or higher. The upper limit is not particularly critical but is usually 3.0 cm/cm$^2$ or less.

The term "average sipe density" refers to the quotient obtained by dividing the sum of the longitudinal lengths of Sipes by the total area of the ground contact surface.

Figure 1:
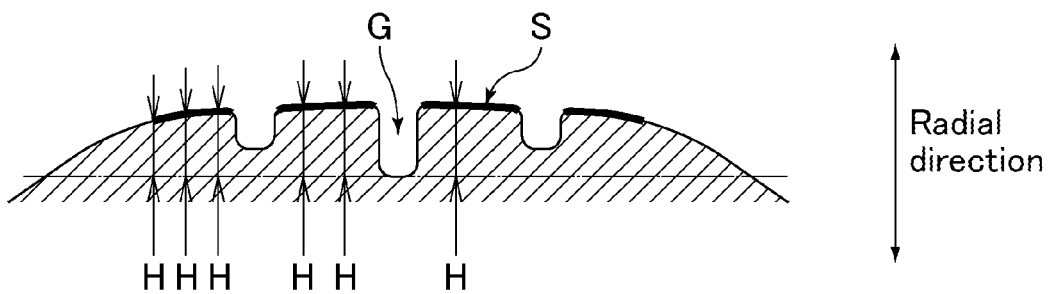
FIG. 1 is a schematic cross-sectional view of an exemplary tread portion.

The term "ground contact surface" refers to a tire surface that makes contact with the road when the tire mounted on a standard rim and inflated to a standard inner pressure is placed perpendicularly on a plane under a normal load (e.g., the parts marked with letter S in FIG. 1).

Figure 2:
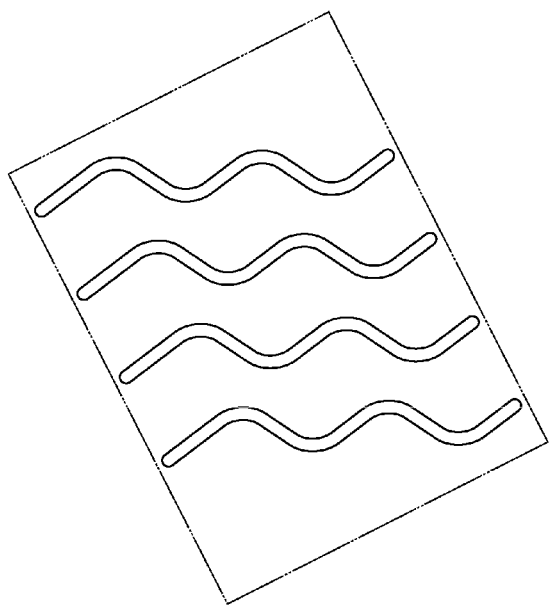
FIG. 2 is a schematic plan view of an exemplary plurality of sipes provided in a block.

The term "sipe" refers to a slit having a width of 1.5 mm or less and a depth of 8 mm or less and formed in a region sandwiched between portions of the ground contact surface when seen in a cross-sectional view of a tread from the tire circumferential direction as shown in FIG. 1. For example, it has a plan-view shape as shown in FIG. 2.

Figure 3:
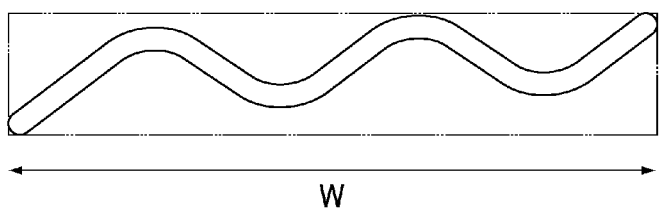
FIG. 3 is a schematic view that illustrates the longitudinal length of a sipe.

The longitudinal length of a sipe refers to the longitudinal length of the minimum-area circumscribed rectangle of the sipe (e.g., the length indicated by arrow W in FIG. 3).

The blocks should have an average height of 0.6 to 2.0 cm. To achieve the effects of the present invention well, the lower limit of the average height is preferably 0.8 cm or more, more preferably 1.0 cm or more, while the upper limit is preferably 1.6 cm or less, more preferably 1.4 cm or less.

The average height of the blocks refers to the average of the lengths in the tire radial direction each extending from a point in the ground contact area of the tread surface to a main groove bottom portion of the tread which is innermost in the tire radial direction (e.g., the lengths indicated by arrows H in FIG. 1).

The term "main groove" refers to a deepest groove having a width of 2 mm or more and a depth of 9 mm or more and formed in a region sandwiched between portions of the ground contact surface when seen in a cross-sectional view of a tread from the tire circumferential direction as shown in FIG. 1 (e.g., the groove marked with letter G in FIG. 1).

The rubber composition for forming the blocks should have a tan δ at 100° C. of 0.179 or less. To achieve the effects of the present invention well, the tan δ is preferably 0.150 or less, more preferably 0.140 or less, still more preferably 0.120 or less. The lower limit is not particularly critical but is usually 0.050 or more.

The tan δ at 100° C. is determined on the vulcanized rubber composition at a temperature of 100° C., an initial strain of 10%, a dynamic strain of 2%, and a frequency of 10 Hz as described in EXAMPLES.

The rubber composition for forming the blocks should have a ratio of the modulus at 100° C. to the modulus at room temperature of 69% or greater. To achieve the effects of the present invention well, the ratio is preferably 70% or greater. The upper limit is not particularly critical and may be 100%, but it is preferably 95% or lower, more preferably 90% or lower.

The modulus at room temperature and the modulus at 100° C. are not particularly critical and may be similar to those of common rubber compositions for tires.

The moduli are determined on the vulcanized rubber composition in accordance with JIS K6251:2010 as described in EXAMPLES.

The tan δ and moduli of the rubber composition may be controlled by varying the types and amounts of chemicals, particularly rubber components, fillers, or vulcanizing agents, used in the rubber composition. Chemicals that may be used in the rubber composition will be described below.

Examples of the rubber component contained in the rubber composition include diene rubbers such as natural rubber (NR), polyisoprene rubber (IR), polybutadiene rubber (BR), styrene butadiene rubber (SBR), acrylonitrile butadiene rubber (NBR), chloroprene rubber (CR), butyl rubber (IIR), and styrene-isoprene-butadiene copolymer rubber (SIBR). These may be used alone or in combinations of two or more. Among these, NR or BR is preferred in order to achieve the effects of the present invention well.

Non-limiting examples of the BR include high-cis BR such as BR 1220 available from Zeon Corporation, and BR130B and BR150B both available from Ube Industries, Ltd., and BR containing syndiotactic polybutadiene crystals such as VCR412 and VCR617 both available from Ube Industries, Ltd. Preferably, the BR has a cis content of 95% by mass or higher.

The BR may also be a modified BR having a functional group interactive with the hydroxy groups of silica. For example, when a small amount of a modified BR is combined with NR and unmodified BR, the modulus of the entire system is reduced. This is probably because the combination allows silica, which tends to be localized in the NR phase, to be distributed in the BR phase as well and further facilitates the silica dispersion in the BR phase.

Moreover, the tan δ at high temperatures is also reduced probably due to the promoted dispersion of silica.

Examples of the functional group of the modified BR include amino, amide, alkoxysilyl, isocyanate, imino, imidazole, urea, ether, carbonyl, carboxyl, hydroxyl, nitrile, pyridyl, alkoxy, and pyrrolidinyl groups. These functional groups may be optionally substituted. Among these, carboxyl, amide, amino, alkoxy, and alkoxysilyl groups are preferred in order to achieve the effects of the present invention well.

The modified BR may be, for example, a chain end-modified BR obtained by modifying at least one chain end of a BR with a compound (modifier) having the functional group; a backbone-modified BR having the functional group in the backbone; or a backbone- and chain end-modified BR having the functional group in both the backbone and chain end (e.g., a backbone- and chain end-modified BR in which the backbone has the functional group and at least one chain end is modified with the modifier).

The modified BR may suitably be one having a vinyl content of 5 to 20% by mass, a cis content of 20 to 60% by mass, and a weight average molecular weight (Mw) of 100,000 to 600,000.

The Mw may be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

To achieve the effects of the present invention well, the amount of the NR based on 100% by mass of the rubber component is preferably 10% by mass or more, more preferably 30% by mass or more, still more preferably 40% by mass or more, but is preferably 70% by mass or less, more preferably 50% by mass or less.

To achieve the effects of the present invention well, the amount of the unmodified BR based on 100% by mass of the rubber component is preferably 10% by mass or more, more preferably 30% by mass or more, still more preferably 36% by mass or more, but is preferably 70% by mass or less, more preferably 60% by mass or less, still more preferably 54% by mass or less.

To achieve the effects of the present invention well, the amount of the modified BR based on 100% by mass of the rubber component is preferably 3% by mass or more, more preferably 5% by mass or more, still more preferably 6% by mass or more, but is preferably 40% by mass or less, more preferably 30% by mass or less, still more preferably 24% by mass or less.

The rubber composition preferably contains silica. The use of silica as filler provides good wet grip performance. When a modified BR is combined with NR and unmodified BR, not only the tan δ at high temperatures but also the tan δ at low temperatures are reduced, possibly resulting in a decrease in wet grip performance. However, by using silica, it is possible to ensure good wet grip performance.

Non-limiting examples of the silica include dry silica (anhydrous silicic acid) and wet silica (hydrous silicic acid). Wet silica is preferred because it has a large number of silanol groups.

The silica may be, for example, a product of Degussa, Rhodia, Tosoh Silica Corporation, Solvay Japan, or Tokuyama Corporation.

In view of wet grip performance, the silica preferably has a nitrogen adsorption specific surface area ($N_2SA$) of 50 $m^2/g$ or more, more preferably 100 $m^2/g$ or more. In view of dispersibility of the silica, the $N_2SA$ is also preferably 300 $m^2/g$ or less, more preferably 200 $m^2/g$ or less, still more preferably 120 $m^2/g$ or less.

The nitrogen adsorption specific surface area of the silica is determined by the BET method in accordance with ASTM D3037-81.

In view of wet grip performance, the amount of the silica per 100 parts by mass of the rubber component is preferably 5 parts by mass or more, more preferably 15 parts by mass or more, still more preferably 30 parts by mass or more. In view of dispersibility of the silica, the amount is also preferably 100 parts by mass or less, more preferably 60 parts by mass or less.

The silica is preferably used together with a silane coupling agent. Non-limiting examples of the silane coupling agent include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(2-triethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane and 2-mercaptoethyltriethoxysilane; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. These may be used alone or in combinations of two or more. Among these, bis(3-triethoxysilylpropyl)disulfide is preferred for good kneading processability.

The silane coupling agent may be, for example, a product of Degussa, Momentive, Shin-Etsu Silicones, Tokyo Chemical Industry Co., Ltd., AZmax. Co., or Dow Corning Toray Co., Ltd.

To facilitate the dispersion of the silica, the amount of the silane coupling agent per 100 parts by mass of the silica is preferably 1 part by mass or more, more preferably 5 parts by mass or more. In view of kneading processability, the amount is also preferably 12 parts by mass or less, more preferably 10 parts by mass or less.

The rubber composition preferably contains carbon black. The use of carbon black as filler provides better durability. Examples of the carbon black include N110, N220, N330, N550, and other grades.

The carbon black may be, for example, a product of Asahi Carbon Co., Ltd., Cabot Japan K.K., Tokai Carbon Co., Ltd., Mitsubishi Chemical Corporation, Lion Corporation, NSCC Carbon Co., Ltd., or Columbia Carbon.

In view of durability, the carbon black preferably has a nitrogen adsorption specific surface area ($N_2SA$) of 50 $m^2/g$ or more, more preferably 80 $m^2/g$ or more, still more preferably 100 $m^2/g$ or more. In view of dispersibility of the carbon black, the $N_2SA$ is also preferably 200 $m^2/g$ or less, more preferably 150 $m^2/g$ or less, still more preferably 120 $m^2/g$ or less.

The $N_2SA$ of the carbon black may be measured in accordance with JIS-K6217-2:2001.

In view of durability, the amount of the carbon black per 100 parts by mass of the rubber component is preferably 10 parts by mass or more, more preferably 20 parts by mass or more, still more preferably 38 parts by mass or more. In view of dispersibility of the carbon black, the amount is also preferably 100 parts by mass or less, more preferably 60 parts by mass or less, still more preferably 45 parts by mass or less.

The rubber composition preferably contains an aromatic petroleum resin. Examples of the aromatic petroleum resin include phenolic resins, coumarone-indene resins, terpene resins, styrene resins, acrylic resins, rosin resins, and dicyclopentadiene resins (DCPD resins). These may be used alone or in combinations of two or more. Among these, styrene resins formed mainly (at least 50% by mass) of styrene are preferred.

The aromatic petroleum resin may be, for example, a product of BASF, Taoka Chemical Co., Ltd., Nippon Steel & Sumikin Chemical Co., Ltd., Nippon Petrochemicals Co., Ltd., Arizona chemical, or Yasuhara Chemical Co., Ltd.

The aromatic petroleum resin preferably has a softening point of 40° C. or higher, more preferably 60° C. or higher, still more preferably 85° C. or higher, but preferably 150° C. or lower, more preferably 100° C. or lower. When the softening point falls within the range indicated above, good wet grip performance and good ice performance can be obtained.

The softening point of the aromatic petroleum resin is determined as set forth in JIS K 6220-1:2001 with a ring and ball softening point measuring apparatus and defined as the temperature at which the ball drops down.

In view of wet grip performance and ice performance, the amount of the aromatic petroleum resin per 100 parts by mass of the rubber component is preferably 3 parts by mass or more, more preferably 5 parts by mass or more, still more preferably 8 parts by mass or more. In view of durability, the amount is also preferably 20 parts by mass or less, more preferably 15 parts by mass or less, still more preferably 12 parts by mass or less.

The rubber composition preferably contains an oil. Examples of the oil include process oils, vegetable fats and oils, and mixtures thereof. Examples of the process oils include paraffinic process oils, aromatic process oils, and naphthenic process oils. Examples of the vegetable fats and oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. These may be used alone or in combinations of two or more. Preferred among these are aromatic process oils.

The oil may be, for example, a product of Idemitsu Kosan Co., Ltd., Sankyo Yuka Kogyo K.K., Japan Energy Corporation, Olisoy, H&R, Hokoku Corporation, Showa Shell Sekiyu K.K., or Fuji Kosan Co., Ltd.

The amount of the oil per 100 parts by mass of the rubber component is preferably 10 parts by mass or more, more preferably 20 parts by mass or more, but is preferably 80 parts by mass or less, more preferably 50 parts by mass or less, still more preferably 40 parts by mass or less. When the amount falls within the range indicated above, the effects of the present invention can be well achieved.

The amount of the oil includes the amount of the oil present in rubber (oil extended rubber).

The rubber composition preferably contains a wax. Non-limiting examples of the wax include petroleum waxes such as paraffin waxes and microcrystalline waxes; naturally-occurring waxes such as plant waxes and animal waxes; and synthetic waxes such as polymers of ethylene, propylene, or other similar monomers. These may be used alone or in combinations of two or more. Among these, petroleum waxes are preferred, with paraffin waxes being more preferred.

The wax may be, for example, a product of Ouchi Shinko Chemical Industrial Co., Ltd., Nippon Seiro Co., Ltd., or Seiko Chemical Co., Ltd.

The amount of the wax per 100 parts by mass of the rubber component is preferably 0.5 parts by mass or more, more preferably 1 part by mass or more, but is preferably 10 parts by mass or less, more preferably 5 parts by mass or less. When the amount falls within the range indicated above, the effects of the present invention can be well achieved.

The rubber composition preferably contains an antioxidant. Examples of the antioxidant include: naphthylamine antioxidants such as phenyl-α-naphthylamine; diphenylamine antioxidants such as octylated diphenylamine and 4,4'-bis(α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis-[methylene-3-(3',5'-di-t-butyl-4'-hydroxyphenyl)-propionate]methane. These may be used alone or in combinations of two or more. Preferred among these are p-phenylenediamine or quinoline antioxidants, with N-(1,3-dimethylbutyl)-N'-phenyl-p-phenylenediamine or 2,2,4-trimethyl-1,2-dihydroquinoline polymer being more preferred.

The antioxidant may be, for example, a product of Seiko Chemical Co., Ltd., Sumitomo Chemical Co., Ltd., Ouchi Shinko Chemical Industrial Co., Ltd., or Flexsys.

The amount of the antioxidant per 100 parts by mass of the rubber component is preferably 0.5 parts by mass or more, more preferably 1.5 parts by mass or more, but is preferably 8 parts by mass or less, more preferably 5 parts by mass or less. When the amount falls within the range indicated above, the effects of the present invention can be well achieved.

The rubber composition preferably contains stearic acid. The stearic acid may be a conventional one, and examples include products of NOF Corporation, NOF Corporation, Kao Corporation, Fujifilm Wako Pure Chemical Corporation, and Chiba Fatty Acid Co., Ltd.

The amount of the stearic acid per 100 parts by mass of the rubber component is preferably 1 part by mass or more, more preferably 3 parts by mass or more, but is preferably 12 parts by mass or less, more preferably 8 parts by mass or less. When the amount falls within the range indicated above, the effects of the present invention can be well achieved.

The rubber composition preferably contains zinc oxide. The zinc oxide may be a conventional one, and examples include products of Mitsui Mining & Smelting Co., Ltd., Toho Zinc Co., Ltd., HakusuiTech Co., Ltd., Seido Chemical Industry Co., Ltd., and Sakai Chemical Industry Co., Ltd.

The amount of the zinc oxide per 100 parts by mass of the rubber component is preferably 0.5 parts by mass or more, more preferably 1.5 parts by mass or more, but is preferably 5 parts by mass or less, more preferably 3 parts by mass or less. When the amount falls within the range indicated above, the effects of the present invention can be well achieved.

The rubber composition preferably contains sulfur. Examples of the sulfur include those commonly used in the rubber industry, such as powdered sulfur, precipitated sulfur, colloidal sulfur, insoluble sulfur, highly dispersible sulfur, and soluble sulfur. These may be used alone or in combinations of two or more.

The sulfur may be, for example, a product of Tsurumi Chemical Industry Co., Ltd., Karuizawa Sulfur Co., Ltd., Shikoku Chemicals Corporation, Flexsys, Nippon Kanryu Industry Co., Ltd., or Hosoi Chemical Industry Co., Ltd.

The amount of the sulfur per 100 parts by mass of the rubber component is preferably 0.8 parts by mass or more, more preferably 1 part by mass or more, still more preferably 1.2 parts by mass or more, but is preferably 5 parts by mass or less, more preferably 3 parts by mass or less. The amount within the range indicated above can allow the rubber composition to have a higher crosslink density and a higher molecular weight, resulting in an improved modulus. Further, the decrease in modulus at high temperatures can be reduced.

The rubber composition preferably contains a vulcanization accelerator. Examples of the vulcanization accelerator include thiazole vulcanization accelerators such as 2-mercaptobenzothiazole, di-2-benzothiazolyl disulfide, and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl) thiuram disulfide (TOT-N); sulfenamide vulcanization accelerators such as N-cyclohexyl-2-benzothiazole sulfenamide, N-t-butyl-2-benzothiazolylsulfenamide, N-oxyethylene-2-benzothiazole sulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These may be used alone or in combinations of two or more. Preferred among these are sulfenamide or guanidine vulcanization accelerators.

The amount of the vulcanization accelerator per 100 parts by mass of the rubber component is preferably 1 part by mass or more, more preferably 1.5 parts by mass or more, but is preferably 5 parts by mass or less, more preferably 3 parts by mass or less. When the amount falls within the range indicated above, the effects of the present invention can be well achieved.

In addition to the above-described components, the rubber composition may further contain additives commonly used in the tire industry, including, for example, organic peroxides; fillers such as calcium carbonate, talc, alumina, clay, aluminum hydroxide, and mica; and processing aids such as plasticizers and lubricants.

The pneumatic tire of the present invention may be produced using the rubber composition by conventional methods. Specifically, the rubber composition containing the components, before vulcanization, may be extruded into the shape of a tire component such as a tread and assembled with other tire components in a usual manner on a tire building machine to build an unvulcanized tire, which may then be heated and pressurized in a vulcanizer to produce a tire.

The pneumatic tire of the present invention may be used as a winter tire (e.g. a studless winter tire or snow tire) or an all-season tire, and is particularly suitable as a studless winter tire.

EXAMPLES

The present invention will be specifically described below with reference to, but not limited to, examples.

The chemicals used in the examples and other sections are listed below.

NR: TSR20
BR: BR150B available from Ube Industries, Ltd.
Modified BR: the product of Production Example 1 (vinyl content: 10% by mass, cis content: 40% by mass, Mw: 400,000)
Carbon black: $N_2SA$ 111 $m^2/g$
Silica 1: $N_2SA$ 175 $m^2/g$
Silica 2: $N_2SA$ 105 $m^2/g$
Aromatic petroleum resin: styrene resin (softening point: 85° C.)
Wax: paraffin wax
Antioxidant 1: N-(1,3-dimethylbutyl)-N'-phenyl-p-phenylenediamine
Antioxidant 2: poly(2,2,4-trimethyl-1,2-dihydroquinoline)
Processing aid: potassium tetraborate
Stearic acid: stearic acid
Zinc oxide: zinc oxide
Silane coupling agent: bis(3-triethoxysilylpropyl)disulfide
Oil 1: aromatic process oil
Oil 2: paraffinic process oil
Sulfur: 5% oil-containing powdered sulfur (The amounts indicated in Tables 1 and 2 are net sulfur contents.)
Vulcanization accelerator 1: N-cyclohexyl-2-benzothiazolylsulfenamide
Vulcanization accelerator 2: diphenylguanidine
Vulcanization accelerator 3: 2-mercaptobenzothiazole Production Example 1: Synthesis of Modified BR A nitrogen-purged autoclave reactor was charged with hexane, 1,3-butadiene, tetrahydrofuran, and ethylene glycol diethyl ether. Next, bis(diethylamino)methylvinylsilane and n-butyllithium were added as a solution in cyclohexane and a solution in n-hexane, respectively, to start polymerization.

The polymerization of 1,3-butadiene was carried out for three hours at a stirring rate of 130 rpm and a temperature inside the reactor of 65° C. while continuously feeding the monomer into the reactor. Then, the resulting polymer solution was stirred at a stirring rate of 130 rpm, and N-(3-dimethylaminopropyl)-acrylamide was added, followed by reaction for 15 minutes. After completion of the polymerization reaction, 2,6-di-tert-butyl-p-cresol was added. Thereafter, the solvent was removed by steam stripping. The resulting product was dried on hot rolls adjusted at 110° C. to obtain a modified polybutadiene rubber (modified BR).

Examples and Comparative Examples

The chemicals other than the sulfur and vulcanization accelerators in the formulation amounts indicated in Table 1 or 2 were kneaded at 150° C. for five minutes using a Banbury mixer. To the kneaded mixture were added the sulfur and vulcanization accelerators, and they were kneaded at 80° C. for 12 minutes using an open roll mill to obtain an unvulcanized rubber composition.

The unvulcanized rubber composition was formed into a tread shape and assembled with other tire components on a tire building machine. The assembly was press-vulcanized at 170° C. for 20 minutes to prepare a test studless winter tire.

The test studless winter tires prepared as above were evaluated as described below. Tables 1 and 2 show the results.

<Modulus (M300)>

No. 6 dumbbell specimens formed of rubber pieces cut from the treads of the test studless winter tires were subjected to tensile testing at 100° C. and room temperature (25° C.) in accordance with JIS K6251:2010 to determine the stress at 300% elongation (M300, MPa). Then, a ratio (%) of the modulus at 100° C. to the modulus at room temperature was calculated.

<tan δ>

The tan δ of test specimens cut from the treads of the test studless winter tires was measured using a viscoelastic spectrometer VES (Iwamoto Seisakusho Co., Ltd.) at a temperature of 100° C., an initial strain of 10%, a dynamic strain of 2%, and a frequency of 10 Hz.

<Durability>

The test tires were run on a drum tester at 230 km/h under conditions including a standard rim (6.0 J), an inner pressure of 260 kPa, a load of 4.56 kN, and a road surface temperature of 80° C. Then, the running time until separation failure occurred in the tread rubber was measured. The results are expressed as an index, with Comparative Example 1 set equal to 100. A higher index indicates better durability at high temperatures and during high-speed running.

<Ice Performance>

A set of test studless winter tires were mounted on a front-engine, rear-wheel-drive car of 2000 cc displacement made in Japan. A test driver drove the car ten laps around a test track under icy road conditions and then evaluated the stability of steering control. The results are expressed as an index, with Comparative Example 1 set equal to 100. A higher index indicates better ice performance (grip performance on ice).

<Wet Grip Performance>

A set of test studless winter tires were mounted on a front-engine, rear-wheel-drive car of 2000 cc displacement made in Japan. A test driver drove the car ten laps around a test track under wet asphalt road conditions and then evaluated the stability of steering control. The results are expressed as an index, with Comparative Example 1 set equal to 100. A higher index indicates better wet grip performance.

TABLE 1

|  |  | Comparative Example | | | | | | | |
|---|---|---|---|---|---|---|---|---|---|
|  |  | 1 | 2 | 3 | 4 | 5 | 6 | 7 | 8 |
| Formulation (parts by mass) | NR | 45 | 45 | 45 | 40 | 40 | 40 | 40 | 40 |
|  | BR | 55 | 55 | 55 | 60 | 24 | 12 | 42 | 60 |
|  | Modified BR | — | — | — | — | 36 | 48 | 18 | — |
|  | Carbon black | 43 | 43 | 43 | 38 | 38 | 38 | 38 | 43 |
|  | Silica 1 | 15 | 15 | 15 | 30 | 30 | 30 | 30 | 30 |
|  | Silica 2 | — | — | — | — | — | — | — | — |
|  | Aromatic petroleum resin | — | — | — | 8 | 8 | 8 | 8 | 8 |
|  | Wax | 1.5 | 1.5 | 1.5 | 1.5 | 1.5 | 1.5 | 1.5 | 1.5 |
|  | Antioxidant 1 | 1.5 | 1.5 | 1.5 | 1.5 | 1.5 | 1.5 | 1.5 | 1.5 |
|  | Antioxidant 2 | 0.5 | 0.5 | 0.5 | 0.5 | 0.5 | 0.5 | 0.5 | 0.5 |
|  | Processing aid | 1 | 1 | 1 | 1 | 1 | 1 | 1 | 1 |
|  | Stearic acid | 4 | 4 | 4 | 4 | 4 | 4 | 4 | 4 |
|  | Zinc oxide | 2 | 2 | 2 | 2 | 2 | 2 | 2 | 2 |
|  | Silane coupling agent | 1.2 | 1.2 | 1.2 | 2.4 | 2.4 | 2.4 | 2.4 | 2.4 |
|  | Oil 1 | — | — | — | 20 | 25 | 25 | 22.5 | 20 |
|  | Oil 2 | 15 | 15 | 15 | — | — | — | — | — |
|  | Sulfur | 0.95 | 0.95 | 0.95 | 0.75 | 1.25 | 1.25 | 1.00 | 0.90 |
|  | Vulcanization accelerator 1 | 1.8 | 1.8 | 1.8 | 1.2 | 1.2 | 1.2 | 1.2 | 1.2 |
|  | Vulcanization accelerator 2 | — | — | — | 0.6 | 0.6 | 0.6 | 0.6 | 0.6 |
|  | Vulcanization accelerator 3 | 0.2 | 0.2 | 0.2 | — | — | — | — | — |
| Performance | Durability index | 100 | 101 | 102 | 95 | 101 | 103 | 97 | 94 |
|  | Ice performance index | 100 | 97 | 94 | 97 | 102 | 104 | 99 | 101 |
|  | Wet grip performance index | 100 | 100 | 100 | 103 | 98 | 95 | 101 | 103 |
| Properties | M300 (100° C.)/M300 (25° C.) [%] | 59 | 59 | 59 | 64 | 62 | 60 | 66 | 72 |
|  | tan δ (100° C.) | 0.260 | 0.260 | 0.260 | 0.192 | 0.158 | 0.154 | 0.175 | 0.194 |
|  | Average sipe density of blocks [cm/cm$^2$] | 2.3 | 2.11 | 1.74 | 1.74 | 1.74 | 1.74 | 1.74 | 1.74 |
|  | Average height of blocks [cm] | 1.1 | 1.1 | 1.1 | 1.1 | 1.1 | 1.1 | 1.1 | 1.1 |

TABLE 2

|  |  | Example | | | | | | |
|---|---|---|---|---|---|---|---|---|
|  |  | 1 | 2 | 3 | 4 | 5 | 6 | 7 |
| Formulation (parts by mass) | NR | 40 | 40 | 40 | 40 | 40 | 40 | 40 |
|  | BR | 48 | 36 | 54 | 48 | 36 | 54 | 36 |
|  | Modified BR | 12 | 24 | 6 | 12 | 24 | 6 | 24 |
|  | Carbon black | 38 | 38 | 38 | 38 | 38 | 38 | 38 |
|  | Silica 1 | 30 | 30 | 30 | — | — | — | — |
|  | Silica 2 | — | — | — | 30 | 30 | 30 | 30 |
|  | Aromatic petroleum resin | 8 | 8 | 8 | 8 | 8 | 8 | 8 |
|  | Wax | 1.5 | 1.5 | 1.5 | 1.5 | 1.5 | 1.5 | 1.5 |
|  | Antioxidant 1 | 1.5 | 1.5 | 1.5 | 1.5 | 1.5 | 1.5 | 1.5 |
|  | Antioxidant 2 | 0.5 | 0.5 | 0.5 | 0.5 | 0.5 | 0.5 | 0.5 |
|  | Processing aid | 1 | 1 | 1 | 1 | 1 | 1 | 1 |
|  | Stearic acid | 4 | 4 | 4 | 4 | 4 | 4 | 4 |
|  | Zinc oxide | 2 | 2 | 2 | 2 | 2 | 2 | 2 |
|  | Silane coupling agent | 2.4 | 2.4 | 2.4 | 2.4 | 2.4 | 2.4 | 2.4 |
|  | Oil 1 | 25 | 25 | 22.5 | 25 | 25 | 22.5 | 25 |
|  | Oil 2 | — | — | — | — | — | — | — |
|  | Sulfur | 1.25 | 1.25 | 1.00 | 1.25 | 1.25 | 1 | 1.25 |
|  | Vulcanization accelerator 1 | 1.2 | 1.2 | 1.2 | 1.2 | 1.2 | 1.2 | 1.2 |
|  | Vulcanization accelerator 2 | 0.6 | 0.6 | 0.6 | 0.6 | 0.6 | 0.6 | 0.6 |
|  | Vulcanization accelerator 3 | — | — | — | — | — | — | — |
| Performance | Durability index | 100 | 101 | 104 | 107 | 111 | 110 | 108 |
|  | Ice performance index | 105 | 105 | 102 | 123 | 123 | 123 | 125 |
|  | Wet grip performance index | 105 | 100 | 100 | 112 | 107 | 107 | 106 |
| Properties | M300 (100° C.)/M300 (25° C.) [%] | 70 | 71 | 69 | 69 | 69 | 70 | 69 |
|  | tan δ (100° C.) | 0.166 | 0.162 | 0.179 | 0.140 | 0.120 | 0.150 | 0.120 |
|  | Average sipe density of blocks [cm/cm$^2$] | 1.74 | 1.74 | 1.11 | 1.74 | 1.74 | 1.11 | 2.87 |
|  | Average height of blocks [cm] | 1.1 | 1.1 | 0.61 | 1.1 | 1.1 | 0.61 | 2.0 |

As shown in Tables 1 and 2, the examples each included a tread including blocks which had an average sipe density of 1.0 cm/cm$^2$ or higher and an average height of 0.6 to 2.0 cm, and further which contained a rubber composition having a tan δ at 100° C. of 0.179 or less as determined at an initial strain of 10%, a dynamic strain of 2%, and a frequency of 10 Hz, and a ratio of the modulus at 100° C. to the modulus at room temperature of 69% or greater as determined in accordance with JIS K6251:2010, and they exhibited improved durability at high temperatures and during high-speed running while ensuring good ice performance. They also had a good level of wet grip performance.

REFERENCE SIGNS LIST

S Ground contact surface
G Main groove
H Length in the tire radial direction extending from a point in the ground contact area of the tread surface to a main groove bottom portion of the tread which is innermost in the tire radial direction
W Longitudinal length of sipe

The invention claimed is:

1. A rubber composition for tires, that comprises a rubber component that includes natural rubber and/or polyisoprene rubber and polybutadiene rubber at concentrations such that the rubber composition has a tan δ at 100° C. of 0.179 or less as determined at an initial strain of 10%, a dynamic strain of 2%, and a frequency of 10 Hz; and a ratio of a modulus at 100° C. to a modulus at room temperature of 69% or greater as determined in accordance with JIS K6251:2010,
the rubber composition further comprising:
silica in an amount of 15 parts by mass or more and 100 parts by mass or less per 100 parts by mass of the rubber component,
carbon black in an amount of 60 parts by mass or less per 100 parts by mass of the rubber component,
sulfur in an amount of 3 parts by mass or less per 100 parts by mass of the rubber component, and
a paraffin wax.

2. The rubber composition for tires according to claim 1, wherein the tan δ at 100° C. is 0.150 or less.

3. The rubber composition for tires according to claim 1, wherein the tan δ at 100° C. is 0.140 or less.

4. The rubber composition for tires according to claim 1, wherein the tan δ at 100° C. is 0.120 or less.

5. A pneumatic tire, comprising a tread, the tread comprising the rubber composition according to claim 1.

6. A pneumatic tire, comprising a tread,
the tread comprising blocks having an average sipe density of 1.0 cm/cm$^2$ or higher and an average height of 0.6 to 2.0 cm,
the blocks comprising a rubber composition that comprises a rubber component that includes natural rubber and/or polyisoprene rubber and polybutadiene rubber at concentrations such that the rubber composition has a tan δ at 100° C. of 0.179 or less as determined at an initial strain of 10%, a dynamic strain of 2%, and a frequency of 10 Hz;
and a ratio of a modulus at 100° C. to a modulus at room temperature of 69% or greater as determined in accordance with JIS K6251:2010,
the rubber composition further comprising:
silica in an amount of 15 parts by mass or more and 100 parts by mass or less per 100 parts by mass of the rubber component,
carbon black in an amount of 60 parts by mass or less per 100 parts by mass of the rubber component,
sulfur in an amount of 3 parts by mass or less per 100 parts by mass of the rubber component, and
a paraffin wax.

7. The pneumatic tire according to claim 6, wherein the tan δ at 100° C. is 0.150 or less.

8. The pneumatic tire according to claim 6, wherein the tan δ at 100° C. is 0.140 or less.

9. The pneumatic tire according to claim 6, wherein the tan δ at 100° C. is 0.120 or less.

10. The pneumatic tire according to claim 6, wherein the pneumatic tire is a winter tire or an all-season tire.

* * * * *